United States Patent Office 2,822,360
Patented Feb. 4, 1958

2,822,360

METALLISABLE AZO DYESTUFFS AND COMPLEX HEAVY METAL COMPOUNDS THEREOF

Hans Ackermann, Riehen, near Basel, Switzerland, assignor to J. R. Geigy A.-G., Basel, Switzerland, a Swiss firm No Drawing. Application March 3, 1955
Serial No. 492,047

Claims priority, application Switzerland March 5, 1954

8 Claims. (Cl. 260—151)

The present invention concerns the production of new metallisable azo dyestuffs and the complex heavy metal compounds thereof, in particular of the blue-green to yellow-green, often very pure, complex chromium compounds. It also concerns their use for the attainment of very fast dyeings on textiles, for the dyeing of lacquers or films as well as the fast dyed material so obtained.

It has been found that valuable metallisable azo dyestuffs are obtained by diazotising an aromatic amine which, in the neighbouring position to the amino group contains a substituent capable of forming the metal complex or a substituent which can be converted into a metallisable group or substituents which can be exchanged therefor. This aromatic amine is then diazotised and coupled with a 2-aminonaphthalene compound coupling in the 1-position which is substituted in the amino group by an organic radical, which latter contains a substituent capable of taking part in the complex formation. The dyestuffs so obtained can be converted with agents giving off metal either on the textile fibre or, preferably, in substance, if desired after or while converting or exchanging one of the substituents of the diazo component in the o-position to the azo linkage into or for a metallisable group to form valuable heavy metal containing dyestuffs.

Diazotised aromatic amines of the isocyclic as well as the heterocyclic series are suitable diazo components for the production of the new dyestuffs. Chiefly the diazoxides of the benzene series which are advantageously negatively substituted and preferably by nitro groups, can be used as diazo components. As amines can be named: 5-nitro-4-methyl- or -4-chloro-2-amino-1-hydroxybenzene, 5- or 4 - nitro - 2 - amino - 1 - hydroxybenzene, 4.6-dinitro - 2 - amino - 1 - hydroxybenzene, 6 - nitro - 4-chloro- and 4 - nitro - 6 - chloro - 2 - amino - 1 - hydroxybenzene, 4 - nitro - 6 - acetylamino- and 6 - nitro-4 - acetylamino - 2 - amino - 1 - hydroxybenzene, 6-nitro - 4 - methyl- or -4 - tert. butyl- or -4 - tert. amyl-2 - amino - 1 - hydroxybenzene; 5- or 6 - nitro - 4 - alkylsulphonyl- or alkenylsulphonyl- and 4 - nitro - 6 - alkylsulphonyl- or alkenylsulphonyl - 2 - amino - 1 - hydroxybenzenes, 6 - nitro - 4 - acyl- and 4 - nitro - 6 - acyl - 2-amino - 1 - hydroxybenzenes, 6 - nitro - 2 - amino - 1-hydroxybenzene - 4 - sulphonic acid amides and 4 - nitro-2 - amino - 1 - hydroxybenzene - 6 - sulphonic acid amides and derivatives thereof substituted organically in the amide group. However, also 4- or 5-alkylsulphonyl, alkenylsulphonyl- and arylsulphonyl - 2 - amino - 1 - hydroxybenzenes as well as 4- or 5-acyl-, e. g. the 4- or 5-acetyl-, propionyl-, or butyryl - 2 - amino - 1 - hydroxybenzenes, 3.4.6 - trichloro - 2 - amino - 1 - hydroxybenzene, 4 - nitro - 2 - amino - 1 - hydroxybenzene - 5- or -6- sulphonic acids, 6 - nitro - 2 - amino - 1 - hydroxybenzene - 4 - sulphonic acid, 2 - amino - 1 -hydroxybenzene - 4 - phenylsulphone - 3' - sulphonic acid, 2 - amino-1 - hydroxybenzene - 4 - sulphonic acid - N - ethylanilide-4" - sulphonic acid, 4 - chloro - 5 - nitro - 2 - amino - 1-hydroxybenzene - 6 - sulphonic acid, 3.4 - dichloro - 5-nitro - 2 - amino - 1 - hydroxybenzene - 6 - sulphonic acid or 6 - nitro - 2 - amino - 1 - hydroxybenzene - 4-carboxylic acid as well as 4 - nitro - 2 - amino - 1 - hydroxybenzene - 6 - carboxylic acid can be used.

Other o-aminophenols or o-aminonaphthols the diazoxides of which have insufficient coupling energy can be acylated at the hydroxyl group, e. g. with p-toluene sulphonic acid chloride, before the diazotisation. They can then be diazotised and coupled whereupon the acyl radical in the dyestuff formed is again split off. Finally, also diazotised primary aromatic amines can be used which contain in the o-position to the diazotised amino group a substituent which has sufficient reactivity or mobility in the dyestuff formed to be converted into or replaced by the hydroxyl group—this conversion or replacement preferably being done under the metallising conditions. Chiefly o-halogen- and o-alkoxyamino compounds, e. g. 2-chloro- or -bromo- 1-aminobenzene, 2.5-dichloro- or -dibromo-1-aminobenzene, 5-alkyl- or -alkenylsulphonyl-2-chloro - 1 - aminobenzenes, 5 - acyl - 2 - chloro - 1 - aminobenzenes, 4- or 5 - nitro - 2 - methoxy - 1 - aminobenzene, 2.5 - dimethoxy - 1 - aminobenzene, 5 - ethoxy - 2-methoxy - 1 - aminobenzene, 1 - amino - 2 - methoxy - 5-chlorobenzene, as well as o-alkoxyaminobenzene sulphonic acids can be used.

Examples of diazo components of the heterocyclic series are: 1 - amino - 2 - hydroxy - 5.4 - hydroxymethylene sulphone, 1 - amino - 2 - methoxy - 5.4 - hydroxymethylene sulphone, 2 - amino - 3 - hydroxy - 6 - chlorophenoxthine - S - dioxide, 2 - amino - 3 - methoxy - 6-chloro - phenoxthine - S - dioxide, 2 - amino - 3 - hydroxy - 6 - methylsulphonyl - phenoxthine - S - dioxide, 2 - amino - 3 - methoxy - 6 - methylsulphonyl - phenoxthine-S-dioxide. Such compounds are obtained for example by the addition of α-halogenalkyl sulphinic acids or o-halogen phenyl sulphinic acids to benzoquinone and then splitting off hydrogen halide while closing the ring in the presence of acid binding agents, nitrating, if necessary methylating the hydroxyl group and reducing the nitro group to the amino group.

Compounds which can be used as N-substituted 2-aminonaphthalene compounds coupling in the 1-position which have a substituent in the organic radical of the secondary amino group taking part in the complex formation are those which in an α- or β- position of this radical contain one of the usual metallisable substituents, e. g. a carboxyl group, a hydroxyl group, an amino group, an acylamino group, a sulphonic acid amide group which can be derived from ammonia or a primary organic amine, a sulphonic acid carbacyl amide group or a carboxylic acid alkyl or aryl sulphonyl amide group. The β-C₂H₄COOH radical, the β-aminoethyl radical, an alkylsulphonyl- or an arylsulphonyl-2-aminoethyl radical and, preferably, a phenyl radical containing one of the metallisable substituents listed above in the 2-position and which can contain other substituents usual in azo dyestuffs, e. g. alkyl, alkoxy, sulphonic acid, carboxylic acid, sulphonic acid amide, (N-substituted included), nitro, acylamino, alkylsulphonyl groups and halogens are examples of substituents in the N-position of the 2-aminonaphthalene coupling component. The 2-(2'-carboxyphenylamino)-naphthalene compounds are particularly advantageous because they produce particularly pure complex chromium compounds and because they are technically easily available, e. g. from 2-aminonaphthalene and derivatives thereof with a free, unhindered 1-position and 2-aminobenzene-1-carboxylic acids according to Bucherer's method. They can also be obtained from 2-chloro- or 2-bromo-benzene-1-carboxylic acids by condensation while splitting off hydrogen halide. Suitable coupling components from these preferred groups are for example, the following unsulphated compounds: 2 - (2'- carboxyphenyl) - aminonaphthalene, 2 - (2' - carboxyphenylamino) - 6 - methoxynaphthalene, 2 - (2' - carboxyphenylamino) - 7 - methoxynaphthalene, 2 - (2'- carboxyphenylamino) - 8 - methoxynaphthalene, 2 - (2'- carboxyphenylamino) - 5 - methoxynaphthalene, 2 - (2'- carboxyphenylamino) - 6 - bromonaphthalene, 2- (2'- carboxyphenylamino) - 6 - tert. butyl naphthalene, 2 - (2'- carboxyphenylamino) - naphthalene - 5- or -6- or -7 - sulphonic acid amide or N-methylamide, 2 - (2' - carboxy-5' - chlorophenyl) - aminonaphthalene, 2 - (2' - carboxy-4' - acetylaminophenyl) - aminonaphthalene. The following can be named as representative sulphated coupling components: 2 - (2' - carboxyphenylamino) - naphthalene - 5 - sulphonic acid, 2 - (2' - carboxyphenylamino)- naphthalene - 6 - sulphonic acid or 2 - (2' - carboxyphenylamino)-naphthalene-7-sulphonic acid.

The diazo components usable according to the present invention are diazotised according to the usual methods in aqueous or organic aqueous mineral acid solution or suspension with sodium nitrite in the cold. The coupling is performed in a neutral, weakly acid or also stronger acid medium if necessary while gradually adding acid buffering agents such as sodium acetate. It is often advantageous to perform the coupling at a temperature higher than usual, e. g. at 40–80° C., often advantageously in the presence of stabilisors for the diazo compound, e. g. in the presence of naphthalene mono- or di-sulphonic acids or of tetraline sulphonic acids.

Generally the dyestuffs according to the present invention are obtained as red to violet powders. The dyestuffs with acid water solubilising groups are obtained in the form of the water soluble alkali salts of a red to violet colour. The conversion into the metal complexes can be done according to the usual methods in aqueous solution or suspension or, often with advantage, according to the composition, in organic solution, by heating in open vessels under reflux or in closed vessels under pressure. Compounds containing trivalent chromium or cobalt, nickel, iron, manganese, can be used as agents giving off metal such as the normal or complex salts of these metals, and also the hydroxides can be used. Due to their often very pure green-blue, green to yellow-green and olive shades, the complex cobalt and particularly chromium compounds are suitable for the dyeing of natural and synthetic polypeptide fibres. In addition they can also be used, as can also the complex metal compounds of other metals, for the dyeing of cellulose esters in the mass and for the production of dyed films.

An advantage of the monoazo dyestuffs according to the present invention is that they can be converted particularly easily into complex metal compounds which contain one heavy metal atom per dyestuff molecule bound in complex linkage. These are often distinguished by particularly pure shades. Although such types can be obtained particularly easily from usual sulphated o-hydroxy-o'-aminoazo dyestuffs for example with chromic salts of stronger acids by boiling in aqueous solution, analogous dyestuffs without sulphonic acid groups can be obtained in this way in aqueous medium only with very great difficulty and the yields and the purity thereof are unsatisfactory. In contrast to this, because of their greater tendency to form metal complexes and the stability of the metal complexes containing one heavy metal atom in the dyestuff molecule, the dyestuffs according to the present invention can be converted into the metal complexes of the type described above in an aqueous medium, even when there are no sulphonic acid groups present.

The following examples illustrate the invention without limiting it in any way. Where not otherwise stated, parts are given as parts by weight and the temperatures are in degrees centigrade. The relationship of parts by weight to parts by volume is as that of kilogrammes to litres.

*Example 1*

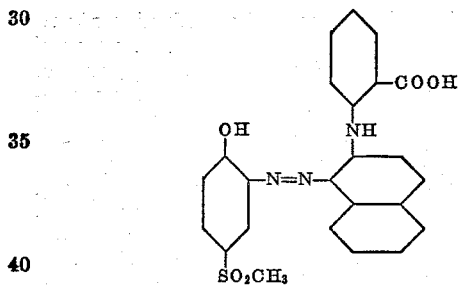

18.7 parts of 2-amino-1-hydroxybenzene-4-methyl sulphone in 150 parts of glacial acetic acid and 17 parts of concentrated hydrochloric acid are diazotised with 6.9 parts of sodium intrite. The yellow solution of the diazoxide is poured into a paste of 27.6 parts of 2-(2'-carboxyphenyl)-naphthylamine in 100 parts of glacial acetic acid. The reaction product is stirred at 40–50° until the diazoxide has completely disappeared, diluted with water, the separated dyestuff is filtered off and is washed with hot water. After drying, the colour acid is a red powder which is easily converted into the water soluble sodium salt by mixing with sodium carbonate. Wool is dyed according to the metachrome process in pure yellowish-green shades.

*Example 2*

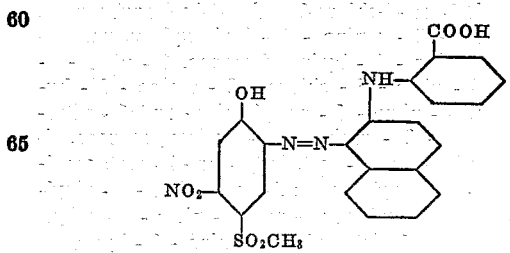

Chromium complex compound 23.2 parts of 5-nitro-2-amino - 1 - hydroxybenzene - 4- methyl sulphone in 100 parts of water are dissolved with 10 parts by volume of 10 N-caustic soda lye, 6.9 parts of sodium nitrite are added and the whole is added dropwise at 0° to a solution of 31 parts of 2-naphthalene sulphonic acid in 200 parts of water. The suspension of the yellow diazoxide is poured into a paste of 27.6 parts of 2-(2′-carboxyphenyl)-naphthylamine in 200 parts of glacial acetic acid and stirred at 70–80° until completion of the dyestuff formation. The dyestuff is filtered off and then washed first with acetic acid and then with hot water. The dried colour acid in 400 parts of ethylene glycol is dissolved with 20 parts by volume of 10 N-caustic soda lye and heated to 120–125° with 28 parts of chromic acetate (corresponding to 5.72 parts of chromium) until the starting dyestuff has disappeared. The green chromium containing dyestuff is precipitated by pouring into sodium chloride solution and it is filtered off. After drying, it is a dark green powder which, after mixing with sodium carbonate, dissolves in water. It dyes wool from an acetic acid bath in pure green shades which have very good fastness properties.

A similar dyestuff is obtained if, instead of 27.6 parts of 2-(2′-carboxyphenyl)-naphthylamine, 31.2 parts of 2-(2′-carboxy-5′-chlorophenyl)-naphthylamine are used.

*Example 3*

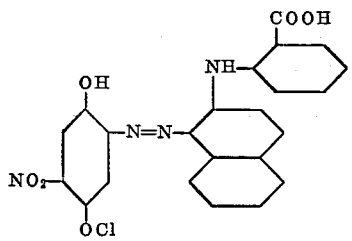

Chromium complex compound 18.9 parts of 5-nitro-4-chloro-2-amino-1-hydroxybenzene are diazotised as described in Example 1 and coupled with 27.6 parts of 2-(2′-carboxyphenyl)-naphthylamine. The dyestuff so obtained is pasted in 300 parts of ethylene glycol monomethyl ether and boiled under reflux with 32 parts of chromic acetate (corresponding to 9.2 parts of $Cr_2O_3$) until the metallisation is complete. The metal containing product is diluted with water and the precipitated chromium complex is filtered off. After drying, it is a green powder which is soluble in hot water after being mixed with substances having an alkaline reaction. It dyes wool from a weakly acid bath in green shades.

*Example 4*

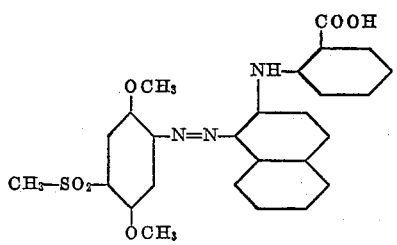

Chromium complex compound 22.9 parts of 2.5-dimethoxy-1-aminobenzene-4-methyl sulphone in 150 parts of water are dissolved with 29 parts of concentrated hydrochloric acid and diazotised at 0–5° with 20.7 parts of a 33% sodium nitrite solution. The yellow diazonium solution is poured into a solution of 27.6 parts of 2-(2′-carboxyphenyl)-naphthyl-amine in 200 parts of ethylene glycol monomethyl ether, 28 parts of crystalline sodium acetate are added and the whole is stirred until the dyestuff formation is complete. The dyestuff is filtered off and after drying, is heated in 400 parts of formamide to 150° with 32 parts of chromic acetate (corresponding to 9.2 parts of $Cr_2O_3$) until the starting dyestuff has disappeared. The still hot chroming mixture is poured into 1000 parts of saturated sodium chloride solution and the precipitated dyestuff is filtered off. After mixing with substances having an alkaline reaction, it is soluble in hot water and it dyes wool from a weakly acid bath in bluish-green shades.

*Example 5*

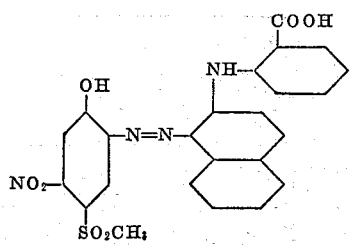

Cobalt complex compound 23.2 parts of 5-nitro-2-amino-1-hydroxybenzene-4-methyl sulphone are diazotised according to Example 2, and coupled with 27.6 parts of 2-(2′-carboxyphenyl)-naphthylamine. The isolated colour acid in 500 parts of hot water is dissolved in 10 parts by volume of 10 N-caustic soda lye and heated for 3 hours at 85–90° with 120 parts of a solution of cobalt acetate (corresponding to 7.1 parts of cobalt). The cobalt complex is completely precipitated by the addition of sodium chloride and is filtered off. After mixing with substances having an alkaline reaction, it is soluble in hot water and it dyes wool from a weakly acid bath in olive green shades.

*Example 6*

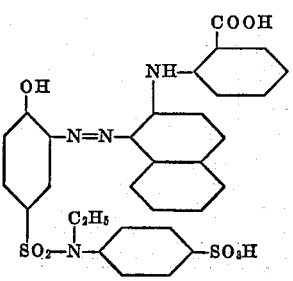

Chromium complex compound 37.2 parts of 2-amino-1-hydroxybenzene-4-sulphethyl anilide-4′-sulphonic acid are diazotised according to Example 2 and coupled at 40–50° with 27.6 parts of 2-(2′-carboxyphenyl)-naphthylamine. The dyestuff is isolated by the addition of sodium chloride solution. It is dissolved in 750 parts of water and boiled under reflux with 300 parts of a solution of chromic sulphate (corresponding to 11.5 parts of $Cr_2O_3$) until the starting dyestuff has disappeared. After drying, it is a green powder which dyes wool from a strong sulphuric acid bath in green shades.

The following dyestuffs can also be produced according to the above examples:

| No. | Diazo component | Azo component | metal | colour on wool |
|---|---|---|---|---|
| 1 | 4-nitro-2-amino-1-hydroxybenzene | 2-(2'-carboxyphenyl)-naphthylamine | Cr | green. |
| 2 | 4.6-dinitro-2-amino-1-hydroxybenzene | ....do | Cr | yellowish green. |
| 3 | 2-amino-1-hydroxybenzene-4-phenyl sulphone-3'-sulphamide. | ....do | Cr | green. |
| 4 | 5-nitro-2-amino-1-hydroxybenzene-4-methyl sulphone. | 2-(2'-carboxy-4'-acetylaminophenyl)-naphthylamine. | | after chromed green. |
| 5 | 5-nitro-2-amino-1-hydroxybenzene | 2-(2'-acetylamino-4'-methylsulphonylphenyl)-naphthylamine. | Cr | grey-green. |
| 6 | ....do | 2-(2'-amino-4'-methylsulphonylphenyl)-naphthylamine. | Cr | Do. |
| 7 | ....do | 2-(2'-carboxyphenyl)-naphthylamine-6-sulphonic acid. | Cr | green. |
| 8 | 5-nitro-4-chloro-2-amino-1-hydroxybenzene | 2-(β-aminoethyl)-naphthylamine | Cr | bluish-green. |
| 9 | ....do | 2-(β-carboxyethyl)-naphthylamine | Cr | Do. |
| 10 | 6-nitro-2-amino-1-hydroxybenzene-4-sulphonic acid. | 2-(2'-carboxyphenyl)-naphthylamine | Cr | green. |
| 11 | 2-amino-1-hydroxybenzene-4-sulphonic acid-(3-chloranilide). | ....do | Cr | Do. |
| 12 | 4-nitro-2-amino-1-hydroxybenzene | 2-(2'-amino-4'-methylsulphonylphenyl)-naphthylamine. | Cr | grey-green. |
| 13 | ....do | 2-(2'-acetylamino-4'-methylsulphonylphenyl)-naphthylamine. | Cr | Do. |
| 14 | 5-nitro-2-amino-1-hydroxybenzene-4-ethyl sulphone. | 2-(5'-chloro-2'-carboxyphenyl)-naphthylamine. | Cr | yellowish green. |
| 15 | 4.6-dinitro-2-amino-1-hydroxybenzene | 2-(β-carboxyethyl)-naphthylamine | Cr | green. |
| 16 | 5-nitro-2-amino-1-hydroxybenzene | 2-(β-aminoethyl)-naphthylamine | Cr | bluish green. |
| 17 | 2-amino-1-hydroxybenzene-4-sulphethylanilide-3'-sulphamide. | 2-(2'-carboxyphenyl)-naphthylamine | Co | green. |
| 18 | 5-nitro-2-amino-1-hydroxybenzene | 2-(2'-carboxyphenyl)-naphthylamine-7-sulphonic acid. | Cr | Do. |
| 19 | 2-aminobenzoic acid methyl ester | 2-(2'-carboxyphenyl)-naphthylamine | Cr | blue-green. |
| 20 | 5-nitro-2-aminobenzoic acid | ....do | Cr | Do. |
| 21 | 2-amino-o-hydroxybenzene-4-methylsulphone. | 2-(β-hydroxyethyl)-naphthylamine | Cr | Do. |
| 22 | 5-nitro-2-amino-1-hydroxybenzene-4-methylsulphone. | ....do | Cr | Do. |
| 23 | ....do | 2-(2'-tolylsulphamido-4'-methylsulphonyl)-naphthylamine. | Cr | olive grey. |
| 24 | 5-nitro-2-amino-1-hydroxybenzene | 2-(2'-methylsulphamido-4'-methylsulphonyl)-naphthylamine. | Cr | Do. |

What I claim is:

1. A dyestuff selected from the group consisting of the monoazo dyestuffs having the formula:

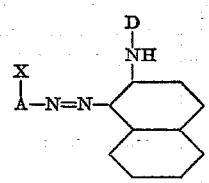

wherein A represents a mononuclear carbocyclic aryl radical, D represents an organic radical selected from the group consisting of the lower alkyl and the mononuclear carbocyclic aryl series containing a group taking part in the metal complex formation, X represents a metallisable group in o-position to the azo group selected from the group consisting of OH and COOH and the chromium and cobalt complexes of said dyestuffs.

2. A dyestuff selected from the class consisting of the monoazo dyestuffs having the formula:

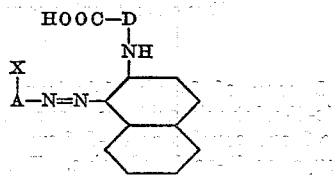

wherein A represents a mononuclear carbocyclic aryl radical, D represents an organic radical selected from the group consisting of lower alkyl and phenyl radicals whereby two carbon atoms should be between the amino and the carboxyl group, X represents a metallisable group in o-position to the azo group selected from the group consisting of OH and COOH, and the chromium and cobalt complexes of said dyestuffs.

3. A dyestuff selected from the class consisting of the monoazo dyestuffs having the formula:

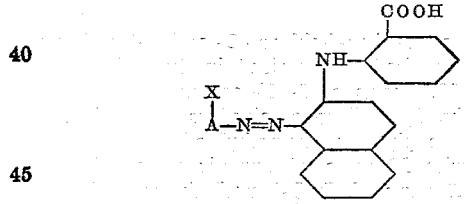

wherein A represents a mononuclear carbocyclic aryl radical, X represents a metallisable group in the o-position to the azo group selected from the group consisting of OH and COOH, and the chromium complexes of said dyestuffs.

4. The complex chromium compound of a monoazo dyestuff having the formula:

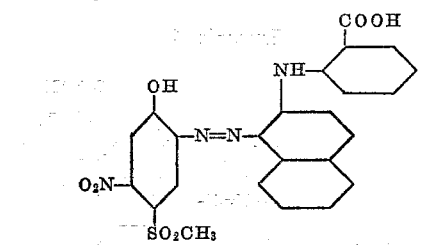

5. The complex chromium compound of a monoazo dyestuff having the formula:

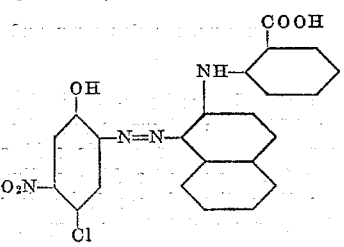

6. The complex chromium compound of a monoazo dyestuff having the formula:
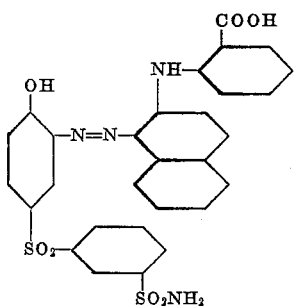
7. The complex chromium compound of a monoazo dyestuff having the formula:
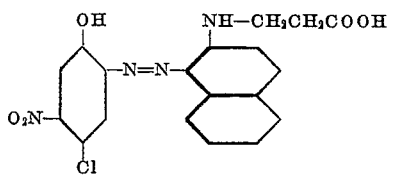
8. The complex chromium compound of a monoazo dyestuff having the formula:
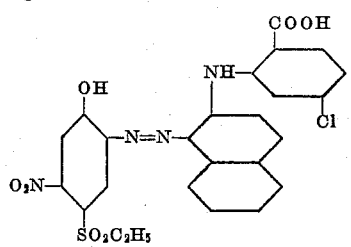
References Cited in the file of this patent
UNITED STATES PATENTS
1,394,823    Grob _____ Oct. 25, 1921
FOREIGN PATENTS
131,253    Switzerland _____ Jan. 31, 1929